C. B. GRAY.
MACHINE FOR CUTTING SHEET FORM MATERIAL.
APPLICATION FILED OCT. 29, 1912. RENEWED DEC. 29, 1913.
1,098,377.
Patented June 2, 1914.
4 SHEETS—SHEET 2.
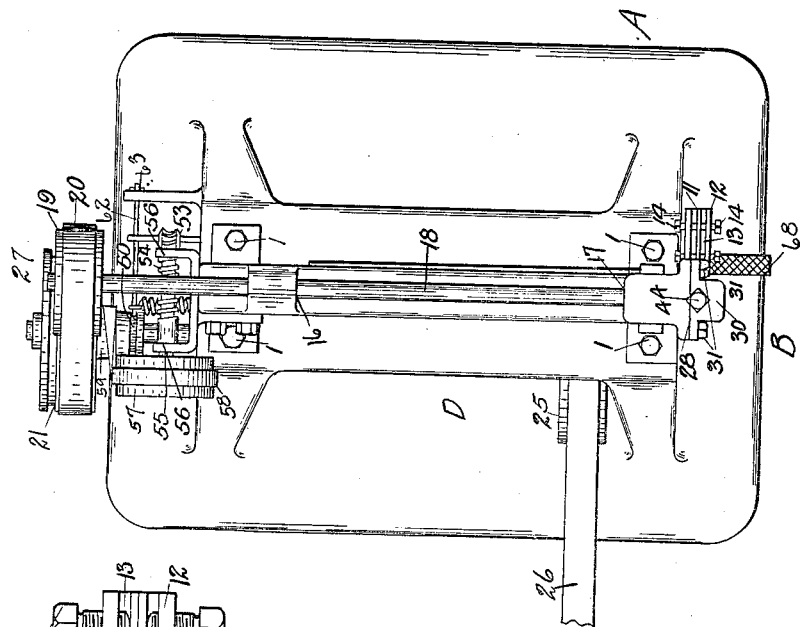
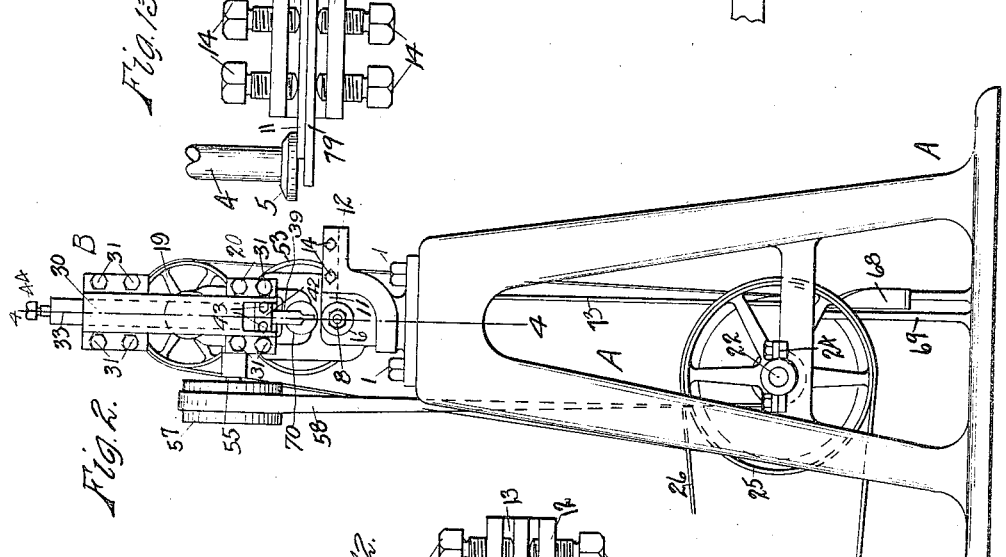
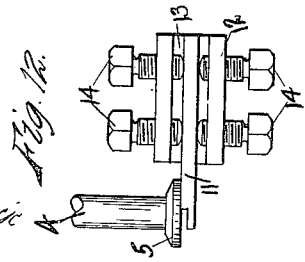
WITNESSES
INVENTOR
Charles B. Gray
By Cyrus K. Ohr
Attorney C. B. GRAY.
MACHINE FOR CUTTING SHEET FORM MATERIAL.
APPLICATION FILED OCT. 29, 1912. RENEWED DEC. 29, 1913.
1,098,377.
Patented June 2, 1914.
4 SHEETS—SHEET 3.
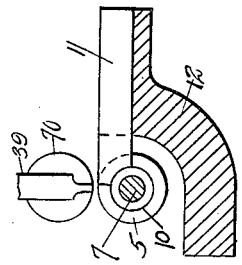
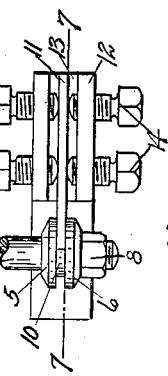
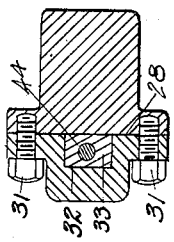
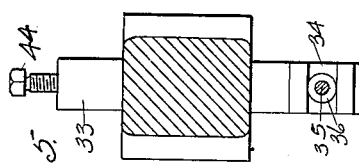
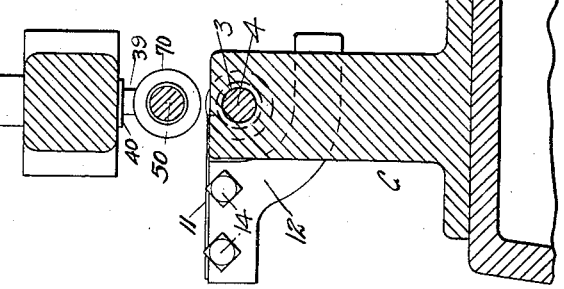
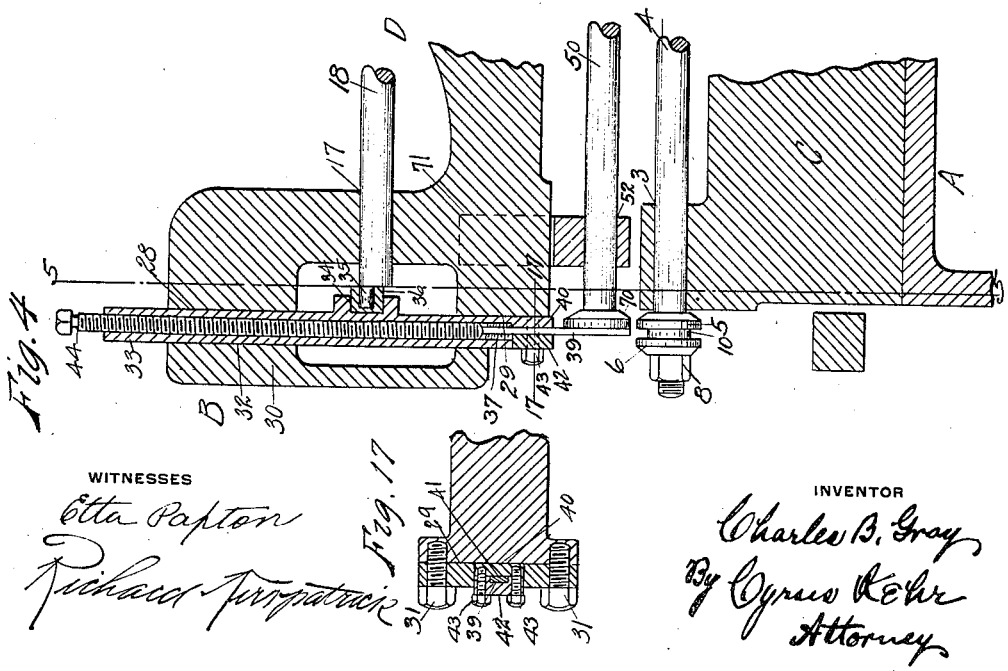
WITNESSES
Etta Paxton
Richard Fitzpatrick
INVENTOR
Charles B. Gray
By Cyrus Kehr
Attorney C. B. GRAY.
MACHINE FOR CUTTING SHEET FORM MATERIAL.
APPLICATION FILED OCT. 29, 1912. RENEWED DEC. 29, 1913.
1,098,377.
Patented June 2, 1914.
4 SHEETS—SHEET 4.
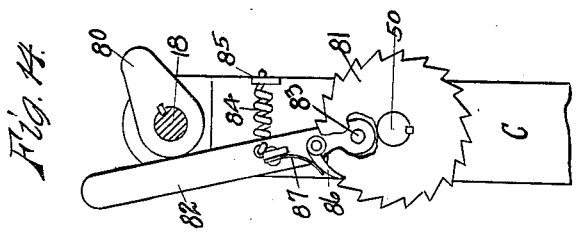
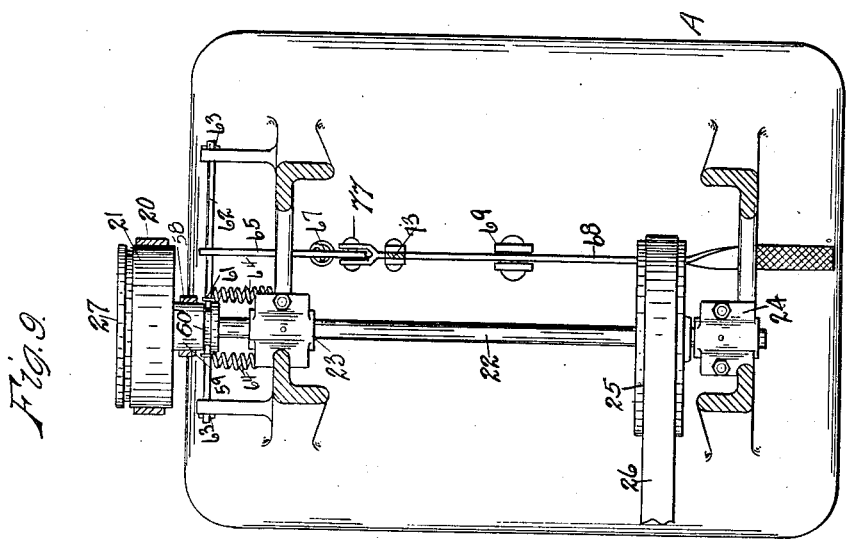
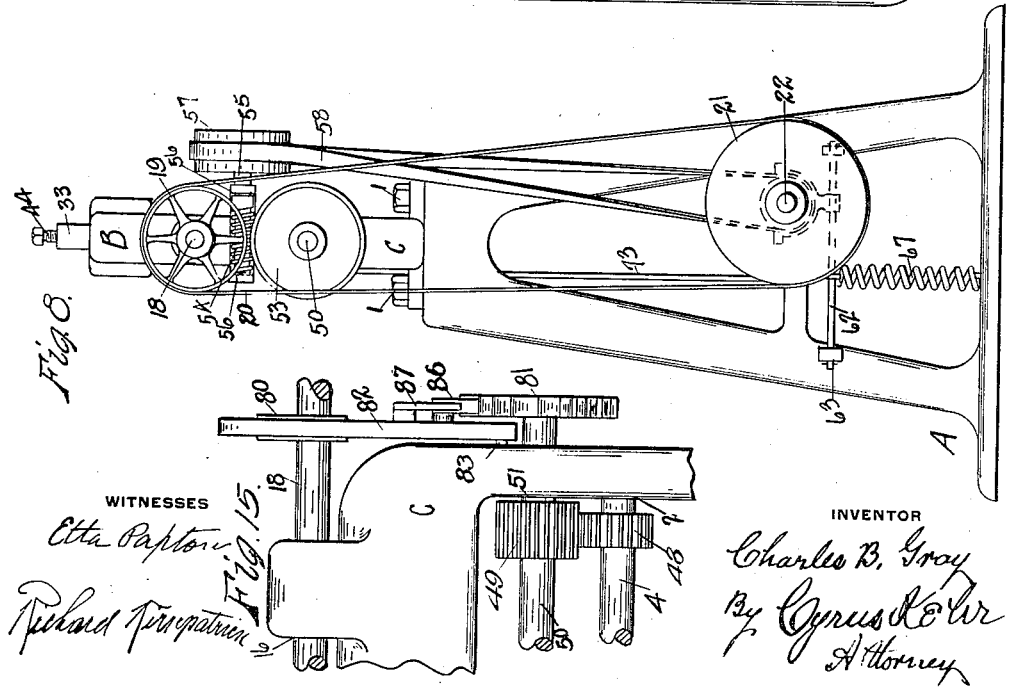
WITNESSES
INVENTOR
Charles B. Gray
By Cyrus Kehr
Attorney

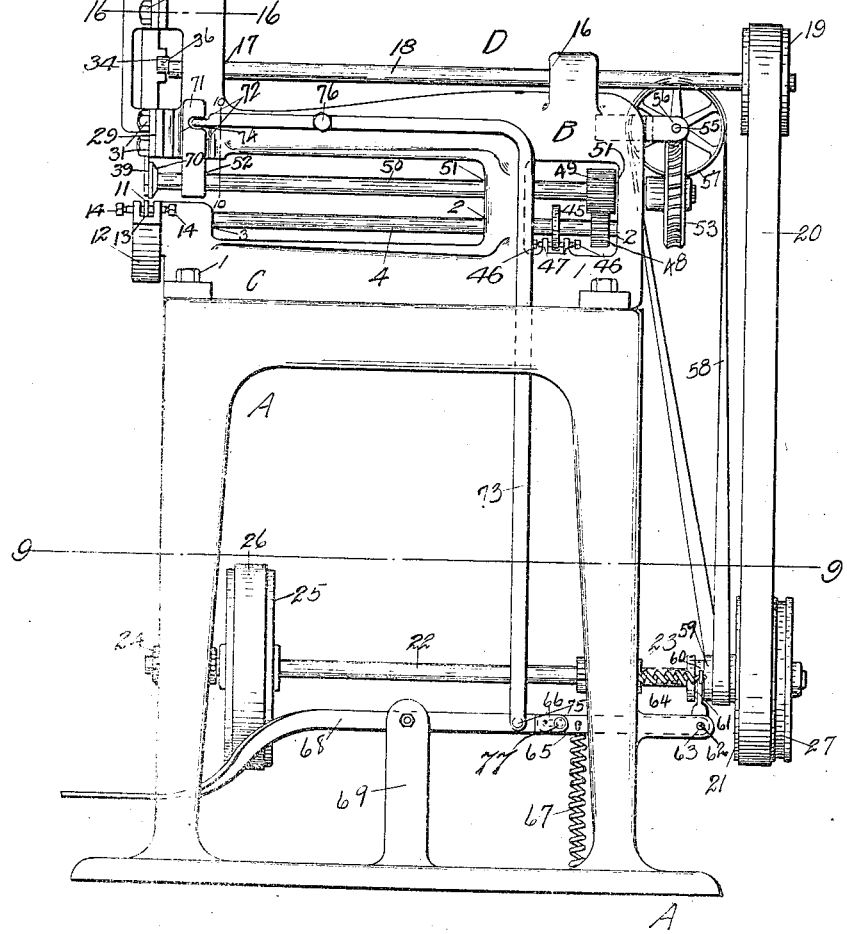

UNITED STATES PATENT OFFICE.

CHARLES B. GRAY, OF KNOXVILLE, TENNESSEE, ASSIGNOR TO CYRUS KEHR, TRUSTEE, OF KNOXVILLE, TENNESSEE.

MACHINE FOR CUTTING SHEET-FORM MATERIAL.

1,098,377.      Specification of Letters Patent.      Patented June 2, 1914.

Application filed October 29, 1912, Serial No. 728,464. Renewed December 29, 1913. Serial No. 809,400.

*To all whom it may concern:*

Be it known that I, CHARLES B. GRAY, a citizen of the United States, residing at Knoxville, in the county of Knox and State of Tennessee, have invented a new and useful Improvement in Machines for Cutting Sheet-Form Material, of which the following is a specification, reference being had to the accompanying drawing.

My improvement relates particularly to machines designed for cutting sheet metal.

The object of the improvement is to provide a machine for rapidly cutting sheets of metal along lines which are curved or change course so frequently as to prevent the use of shearing machines and to make the use of hand shears difficult.

My improved machine comprises means for holding and feeding the sheet and means for cutting through the sheet, which means coöperate in such manner as to allow the guiding of a sheet through the mechanism in the same manner as cloth is ordinarily guided through a sewing machine for stitching along any desired course.

In the form of the machine shown by the drawings, the feeding and cutting mechanism are merged to the extent that at least one of the feeding members is also a cutting member, as will hereinafter appear, said machine comprising as its principal elements a stationary cutter, a rotary cutter and feeding member, and a reciprocable cutter working in conjunction with said stationary cutter and said rotary cutting and feeding member.

In the accompanying drawings, Figure 1 is a front elevation of a machine embodying my improvement; Fig. 2 is an elevation looking toward the right in Fig. 1; Fig. 3 is a plan of the machine as shown in Fig. 1, the front of the machine being toward the right; Fig. 4 is a detail section on the line 4—4, of Fig. 2, looking toward the left, portions being left uncut; Fig. 5 is a section on the line 5—5, of Fig. 4 looking toward the left. Fig. 6 is a detail of the cutting and feeding members; Fig. 7 is a horizontal section on the line, 7—7, of Fig. 6; Fig. 8 is an end elevation looking toward the left in Fig. 1; Fig. 9 is a horizontal section on the line, 9—9, of Fig. 1; Fig. 10 is a transverse, upright section at the right of one of the bearings of the feed roller shaft, the view being toward the left of said bearing as viewed in Fig. 1; Fig. 11, is a detail elevation of the horizontal rock shaft arm; Fig. 12 is a detail plan showing a single rotary cutter and a single stationary cutter having two cutting edges set for coöperation with the reciprocatory cutter; Fig. 13 shows a similar view with two stationary cutters, each having one cutting edge set for coöperation with the reciprocatory cutter; Fig. 14 is a transverse sectional elevation showing another means for transmitting motion to the feed shaft; Fig. 15 is a view of the same mechanism looking toward the right; Fig. 16 is a section on the line 16—16 of Fig. 1; Fig. 17 is a section on the line 17—17 of Fig. 4.

Referring to said drawings, A is the frame and B is the "head" of the machine. This resembles the head of a sewing machine. Bolts, 1, 1, secure the head to the frame. Said head has a base, C, and an arm, D, which are similar to the corresponding parts of a sewing machine head.

The sheet to be cut is moved horizontally through the space between the base, C, and the arm, D, such movement being automatic and from front to rear the same as cloth is fed through an ordinary sewing machine. In the form shown in Figs. 1 to 11, inclusive, the feeding mechanism consists of two rollers bearing against the bottom of the sheet and an upper roller bearing against the upper face of the sheet, the two lower rollers being mounted on a horizontal, rotary shaft and the upper roller being mounted on another shaft which is parallel to the lower shaft. These rollers rotate so as to carry rearward the portions thereof which bear against the sheet, whereby the sheet is carried rearward. The two lower rollers serve also as cutters in coöperation with an upper upright reciprocatory cutter which is actuated by an upper, horizontal shaft in the same manner as a needle-bar of a sewing machine is ordinarily reciprocated by the needle-bar drive shaft. Said reciprocatory cutter and said lower rollers cut parallel to the movement of the sheet. For transversely cutting between the line on which the reciprocatory cutter and the two lower rollers make cuts, a stationary cutter is placed between the two lower rollers so as to cut in conjunction with the front edge of the reciprocatory cutter. This, it will be observed, involves cutting out a portion of the sheet, such portion having a width according to the space between the two lower rollers. The portion thus cut out would be ribbon-form in the absence of the cutting done by the reciprocatory cutter and the stationary cutter, but with each reciprocation of the upper cutter, these cutters cut such portion of the sheet transversely, thus forming small chips or fragments.

The head, B, has bearings, 2 and 3, which receive the cutter roller shaft, 4. The left hand end of said shaft projects through the bearing, 3, and is there formed into a neck, 7, to receive the inner cutter roller, 5, and the outer cutter roller, 6. A nut, 8, is threaded to said shaft for driving said rollers toward the adjacent bearing, 4, and the shoulder, 9, at the inner end of said neck. Said rollers are spaced from each other by means of a spacing ring or washer, 10, which surrounds the shaft between said rollers and is of smaller diameter than the rollers, in order that the reciprocatory cutter and the stationary cutter may extend between said rollers. By tightening the nut, the rollers and washer are firmly bound into position. The stationary cutter, 11, is set horizontally in a bracket, 12, located forward of the lower roller. Said bracket has an upright channel, 13, on the bottom of which said cutter rests, and from each side of the channel, two set-bolts, 14, extend horizontally through the bracket into the channel. The inner ends of said bolts bear against the cutter and bind the latter immovably. The bolts at one side may be re-tracted and the others driven forward, as may be needed to properly adjust the cutter to the space between the cutter rollers, 5 and 6. This cutter is extended rearward until its cutting edge is substantially above the axis of the shaft, 4, or at the highest portion of the rollers, 5 and 6. The rear portion of the cutter may be made to rest on the spacing washer, 10, as shown in Fig. 6. If the main portion of the cutter extends below the level of the highest portion of said washer, the lower portion of the rear end of the cutter may be cut away to conform to the washer, as shown at 15 in Fig. 6.

In the upper portion of the head, B, are two bearings, 16 and 17, the latter being in the outer portion of the arm, D. A rotary shaft, 18 rests in said bearings and has at its right hand end a band wheel, 19, which receives a belt, 20, which also surrounds a pulley, 21 which is on a drive shaft, 22, resting in bearings, 23 and 24, in the frame, A. On the shaft, 22, is a pulley, 25, which receives power through the belt, 26, which leads to any source of power. Said belt, pulley, and shaft are driven constantly. The pulley, 21, is an outer friction clutch member loose on the shaft, 22. An inner friction clutch member, 27, is immovable on the shaft, 22, and extends into the clutch member, 21. The pulley or outer clutch member, 21, will rotate only when it is pressed against the inner clutch member, 27, by the means to be hereinafter described. Above the bearing, 17, the arm, D, has a face, 28, which is upright and directed toward the left. Below said bearing is a similar face, 29, in the same plane as the face, 28, the middle of said arm being extended toward the left so as to bring the plane of said faces approximately even with the adjacent end of the shaft, 18. A plate, 30, is secured against both of said faces by means of screw bolts, 31. In the face of said plane which rests against the faces, 28 and 29, is formed an upright channel, 32, (Fig. 16) to receive a reciprocatory cutter bar, 33. On the right hand side of the cutter bar is a transverse channel, 34, into which extends a crank, 35. An anti-friction roller, 36, surrounds said crank and is of proper size to fill said channel; and said channel is long enough to retain said roller and crank during the rotation of the latter. It will be seen that during such rotation the cutter bar is reciprocated in the upright channel, 32, through a distance equal to twice the length of the crank. A threaded passage, 37, extends lengthwise through the cutter bar. The reciprocatory cutter, 39, extends upward into said passage. At the right of said cutter, the cutter bar has a downward extension, 40, against which said cutter lies. A clamping plate, 42, having a channel, 41, to receive the cutter, extends across the cutter bar and said extension and is secured to the latter by means of screw bolts, 43. By tightening said bolts, the cutter is securely clamped to the cutter bar. To provide for upright adjustment and an abutment against which the upper end of the cutter may bear, a screw, 44, is driven downward lengthwise through the cutter bar to and against the upper end of the cutter, 39. To set the cutter so as to bring its lower end to a precise height, the bolts, 43, are loosened, the screw, 44, retracted, the cutter pushed upward higher than its working position, and the screw, 44, then slowly driven downward, whereby the cutter is slowly driven downward, the turning of the screw, 44, being stopped when the lower end of the cutter reaches precisely the desired position. The screw bolts, 43, are then tightened.

From the foregoing description it will be seen that no provision is made for adjusting the reciprocatory cutter from right to left. This is unnecessary, because provision is made for adjusting the cutter rollers, 5 and 6, rightward and leftward. For this purpose, an annular flange, 45, is formed or placed on the cutter roller shaft, 4, and set-bolts, 46, rest in standards, 47, at opposite sides of said flange and bear against the latter. By retracting one of said bolts and turning the other forward, said flange and shaft and the cutter rollers 5 and 6, are correspondingly moved in the same direction. The outer cutter roller, 6, may be adjusted toward and from the inner cutter roller, 5, by varying the thickness of the spacing washer, 10.

At the lower end of the reciprocatory cutter, its right and left sides are made flat at the lower end of the cutter, in order that during its reciprocation said cutter may bear closely against the adjacent faces of the cutter rolls—closely enough to produce shearing action between the adjacent edges of said rolls and said cutter. The forward, lower edge of the reciprocatory cutter is shaped to conform to the upper, rear edge of the stationary cutter, 11. These edges are most conveniently formed straight. And said upper, rear edge of the stationary cutter is to be brought approximately to the level of the highest portions of the cutter rolls, in order that the shearing action between the stationary cutter and reciprocatory cutter may take place in the same plane as the shearing action between the cutter rolls and reciprocatory cutter takes place, such plane being the plane in which the sheet to be cut lies. Inasmuch as each stroke of the reciprocatory cutter is to advance the cut through only a short distance in the sheet, the latter is to be fed forward only a short distance, and accordingly the shaft, 4, bearing the cutter roller is to rotate slowly with reference to the operation of the cutter bar shaft, 18.

The shaft, 4 receives motion from the drive shaft, 22, as follows: On the cutter roller shaft, 4, is a spur gear wheel, 48, meshing with a spur gear wheel, 49, on the feed shaft, 50, which shaft rests in bearings, 51 and 52. On said shaft is a worm wheel, 53, meshing with a worm, 54, on a shaft, 55, resting in bearings, 56, and having at one end a pulley, 57. A belt, 58, surrounds said pulley and a smaller pulley 59, which is a portion of the outer clutch member, 21. By making the pulley, 59, smaller than the pulley, 57, and by using the worm gearing, the motion transmitted from the drive shaft, 22, to the cutter roller shaft, 4, is reduced. The pulley 19, is made smaller than the pulley, 21, whereby the motion transmitted from the shaft 22, to the shaft, 18, is increased. The clutch member, 21, has a groove, 60, which receives a fork, 61, on the rock-shaft, 62, which rests in bearings, 63. Two contracting coiled springs, 64, are joined by one end to said fork and by the other end to the frame at the left of said fork and tend to turn said fork leftward so as to draw the outer clutch member away from the inner clutch member. An arm, 65, extends horizontally leftward from the rock-shaft. A contracting coiled spring, 67, is joined by its upper end to the arm, 65, and by its lower end to the frame, so that said spring normally draws said arm downward, whereby the rock-shaft, 62, is turned, and the clutch fork and the outer clutch member are moved away from the inner clutch member. A foot lever, 68, is pivoted between its ends to a standard, 69, and coupled by one end to the horizontal rock-shaft arm, 65, by a bolt, 77, while its other end extends leftward into a position to be conveniently reached by the foot of the operator standing in front of the left hand portion of the machine. The left-hand end of the arm, 65, has a slot, 66, to allow play for the bolt, 77, at the coupling to the foot lever. From the foregoing it will be seen that when the foot lever is left free, the action of the springs, 64, and 67, draws the outer clutch member away from the inner clutch member, so that the outer clutch member does not rotate. This puts the shafts, 4 and 18, and the cutter rollers and the reciprocatory cutter at rest. When it is desired to put said parts into motion, the left hand portion of the foot lever is pressed downward with sufficient force to over-come the springs and to engage the outer clutch member with the inner clutch member. When it is desired to stop the operation, the pressure of the foot is removed from the foot lever, whereupon the spring moves the outer clutch member away from the inner clutch member, as already described.

The feeding of the sheet of material to be cut is accomplished by the coöperation of the cutter rollers (chiefly the inner) and the feed roller, 70. The sheet is guided by the hands of the operator. The feed shaft, 50, is directly above the cutter roller shaft, 4, and the spur gear wheels, 48 and 49, have the same number of teeth so that said shafts rotate at the same velocity but in opposite directions. The transmission from the drive shaft, 22, is such as to cause the engaging portions of said spur gear wheels and the adjacent faces of said shafts to move rearward. On the shaft, 50, above the inner cutter roller, 5, is a feed roller, 70, the left hand face of which is set to easily clear the reciprocatory cutter. The feed roller is of the same diameter as the cutter, 5, in order that their peripheries may travel in unison, and the space between said rollers is sufficient for the admission of a sheet of material which is to be cut. In order to adapt these rollers to engage and release the sheet and to take sheets of different thicknesses, within suitable range, the feed roller is made adjustable toward and from the cutter roller. For this purpose, the bearing, 52, is formed for limited up and down adjustment. Arms, 71, extend upward from each side of the bearing, 52, and along the side faces of the arm, D, in channels, 72, so that said bearing may move up and down and be guided in such movement by the arm, D. Such up and down movement of said bearing imparts corresponding movement to the adjacent end of the feed shaft and the feed roller. As above indicated, this movement is to be through limited range to allow for engaging and releasing and to adapt the mechanism to sheets of material varying in thickness to a limited extent. A lever, 73, has one end coupled to one of the arms, 71, by entering a notch, 74, in the bearing, and has its other end coupled to the foot lever, 68, at 75, rightward of the standard, 69. Said lever is pivoted to the arm, D, by a bolt, 76. When the free end of the foot lever, 68, is depressed, and the opposite end moves upward, the portion of the lever, 73, at the right of the bolt, 76, is pushed upward, while the portion leftward of said bolt is turned downward. The lever, 73, is made flexible, in order that it may be moved enough to depress the bearing, 52, before the right hand end of the foot lever, 68, reaches its upper limit. This allows the pressure of the feed roller upon sheets varying in thickness during a suitable portion of the movement of the foot lever.
As will now be understood, the feeding of the sheet to be cut is rearward, for the opposing portions of the inner cutter roller and the feed roller move rearward when the machine is put into action. When the sheet has been inserted between said rollers and the free end of the foot lever has been depressed, the sheet is clamped by the inner cutter roller and said feed roller. Then the reciprocating cutter moves downward and shears the sheet between its side edges and the edges of the two cutter rollers and between its forward edge and the rear edge of the stationary cutter. If only the edge of the sheet has been inserted, a piece is thus cut out of said edge and a slot equal to the space between the two cutter rollers is thus started. With the next stroke of the reciprocatory cutter, a cut is again made along the edge of each cutter roller and between the forward edge of the reciprocatory cutter and the rear edge of the stationary cutter, these cuts extending said slot as much as the sheet has been fed forward between strokes of the reciprocatory cutter. A small piece of the sheet is thus freed at each stroke and falls away as a chip. If the sheet is inserted between the cutter rollers and the feed roller far enough to make the first cut away from the edge of the sheet, the first cut will leave an attached tongue of the material of the sheet, and the succeeding cuts will separate small pieces or chips. While the operation is proceeding, the operator may turn the sheet in its horizontal plane as much as may be desired, just as a sheet of cloth is ordinarily turned in feeding it through a sewing machine. It is to be observed that the sheet is held only by the inner cutter roller and the feed roller and the area of such engagement of said rolls is limited and may, for practical purposes, be regarded as a point upon which the sheet may turn. Since the cutting devices operate at one side of said turning point, there is some tendency toward the turning of the sheet by the action of the cutting members. But such tendency is so slight and so easily resisted by the operator as to be immaterial.

In Fig. 12, the outer roller, 6, has been omitted and the stationary cutter extended rearward in the space previously occupied by said roller, so that said cutter presents a cutting edge to engage with the outer lateral cutting edge of the reciprocatory cutter as well as with the forward edge of said cutter. In Fig. 13, the outer cutter roller, 6, has also been omitted and a stationary cutter, 79, placed beside the stationary cutter, 11, in the channel, 13, with the rear portion of its right-hand edge extending into position to produce shearing action with the left hand edge of the reciprocatory cutter. In this case, the cutters, 79 and 11, are both secured by the bolts, 14.

It is to be observed that in the form of the machine already described, the feed mechanism constantly tends to move the sheet forward. But such forward movement is resisted by the reciprocatory cutter while the latter engages the sheet. Since said cutter is strong and the two rollers which feed the sheet form only frictional engagement therewith, the reciprocatory cutter can arrest the forward movement of the sheet by overcoming such frictional engagement, the sheet again moving forward immediately after the reciprocatory cutter disengages itself from the sheet. Practice has shown that this operation is feasible.

In Figs. 14 and 15, I show mechanism for intermittently transmitting limited movement to the rollers. On the reciprocatory cutter shaft, 18, is a cam, 80; and on the shaft, 50, as a substitute for the worm gear, 53, is a ratchet wheel, 81, said cam and said ratchet wheel being keyed on their respective shafts. An arm, 82, is hinged at 83, to the head, C, just above the shaft, 50. A contracting coiled spring, 84, is joined by one end to the arm, 82, and by its other end to a bracket, 85, on the head, C. Said spring tends to draw said arm toward the cam, 80. During each rotation of the shaft, 18, said cam pushes said arm away from said shaft against the action of the spring. On the arm, 82, is a pawl, 86, directed away from the spring, 84, and set to engage the teeth of the ratchet wheel, 81. A spring 87, is mounted upon the arm, 82, and bears upon said pawl to press the free end thereof toward the ratchet wheel. When the arm, 82, is pushed away from the shaft, 18, by the cam, 80, the pawl bears against one of the ratchet teeth and thereby partially rotates said wheel. When the cam releases said arm, the spring draws the arm toward the shaft, 18, the ratchet trailing or slipping over one or more teeth on the ratchet wheel. The cam, 80, is so set as to shift the arm, 82, during the time the reciprocatory cutter is out of engagement with the sheet. The parts are to be so proportioned as to impart to the shaft, 50, during each rotation of the shaft, 18, such a portion of a rotation as will cause the rollers to turn as much as will move the sheet forward the desired distance between the strokes of the reciprocatory cutter.

I claim as my invention:

1. In a machine of the nature described, the combination of a stationary cutter and a rotary cutter located at one side of the sheet plane, and a reciprocatory cutter located at the other side of the sheet plane working in conjunction with said stationary cutter and said rotary cutter for cutting, substantially as described.

2. In a machine of the nature described, the combination of a stationary cutter, a rotary cutter, a reciprocatory cutter working in conjunction with said stationary cutter and said rotary cutter, and means coöperating with said rotary cutter for feeding a sheet of material resting upon said rotary cutter, substantially as described.

3. In a machine of the nature described, the combination of a stationary cutter, a pair of rotary cutters, and a reciprocatory cutter working in conjunction with said stationary cutter and said rotary cutters, substantially as described.

4. In a machine of the nature described, the combination of a stationary cutter, a pair of rotary cutters, a reciprocatory cutter working in conjunction with said stationary cutter, and means coöperating with one of said rotary cutters for feeding a sheet of material resting upon said cutter, substantially as described.

5. In a machine of the nature described, the combination of a stationary cutter, a rotary cutter, a reciprocatory cutter working in conjunction with said stationary cutter and said rotary cutter and a feed roller operating in conjunction with said rotary cutter for engaging and feeding a sheet of material resting upon said rotary cutter, substantially as described.

6. In a machine of the nature described, the combination of a stationary cutter, a rotary cutter, a reciprocatory cutter working in conjunction with said stationary cutter and said rotary cutter; sheet feeding means coöperating with said rotary cutter, and means controlled by the operator for controlling said feeding means, substantially as described.

7. In a machine of the nature described, the combination of a stationary cutter, a rotary cutter, a reciprocatory cutter working in conjunction with said stationary cutter and said rotary cutter, a feed roller coöperating with said rotary cutter, and means controlled by the operator for controlling said feed roller, substantially as described.

8. In a machine of the nature described, the combination of a stationary cutter, a rotary shaft, a cutter roller on said shaft, means for adjusting said shaft endwise, and a reciprocatory cutter working in conjunction with said stationary cutter and said cutter roller, substantially as described.

9. In a machine of the nature described, the combination of a stationary cutter, a rotary shaft, means for adjusting said shaft endwise, a pair of cutter rollers on said shaft, means for adjusting one of said rollers toward and from the other, and reciprocatory cutter working in conjunction with said stationary cutter and said rotary cutter, substantially as described.

10. In a machine of the nature described, the combination of a stationary cutter, a rotary shaft, a pair of rotary cutters on said shaft, spacing means between said rotary cutters, and a reciprocatory cutter working in conjunction with said stationary cutter and said pair of rotary cutters, substantially as described.

11. In a machine of the nature described, the combination of a stationary cutter, a rotary shaft, means for adjusting said shaft endwise, two cutter rollers on said shaft, spacing means between said cutter rollers, and a reciprocatory cutter working in conjunction with said stationary cutter and said rotary cutter, substantially as described.

12. In a machine of the nature described, the combination of a rotary shaft, a cutter roller on said shaft, means for adjusting said shaft endwise, means for adjusting the stationary cutter in a course parallel to said shaft, and a reciprocatory cutter working in conjunction with said stationary cutter and said rotary cutter, substantially as described.

13. In a machine of the nature described, the combination of a stationary cutter, a rotary shaft, a rotary cutter on said shaft, means for slowly rotating said shaft, a reciprocable cutter set for working in conjunction with said stationary cutter and said rotary cutter, and means for reciprocating said reciprocable cutter rapidly, substantially as described.

14. In a machine of the nature described, the combination of a stationary cutter, a rotary shaft, a rotary cutter on said shaft, means for slowly rotating said shaft, a reciprocable cutter set for working in conjunction with said stationary cutter and said rotary cutter, and a rotary shaft in operative relation with said reciprocable cutter for reciprocating the latter rapidly, substantially as described.

15. In a machine of the nature described, the combination of a stationary cutter, two rotary shafts, a rotary cutter on one of said shafts, a feed member on the other of said shafts adapted for coöperation with said rotary cutter, means for slowly rotating said shafts, a reciprocable cutter set for working in conjunction with said stationary cutter and said rotary cutter and a rotary shaft in operative relation with said reciprocable cutter for reciprocating the latter rapidly, substantially as described.

16. In a machine of the nature described, the combination of a stationary cutter, a rotary cutter, a reciprocatory cutter working in conjunction with said stationary cutter and said rotary cutter, a rotary feeding member coöperating with said rotary cutter, power transmitting means for driving said cutters and said feeding member, and a lever for putting said power transmitting means into action and at the same time moving said rotary feeding member toward said rotary cutter, substantially as described.

17. In a machine of the nature described, the combination of a stationary cutter, a rotary cutter, a reciprocatory cutter working in conjunction with said stationary cutter and said rotary cutter, a rotary feeding member coöperating with said rotary cutter, power transmitting means for driving said cutters and said feeding member, automatic means for putting said power transmitting means out of action, and a member controlled by the operator for putting said power transmitting mechanism into action and at the same time pressing said rotary feeding means toward said rotary cutter, substantially as described.

18. In a machine of the nature described, the combination of a stationary cutter, a rotary cutter, a reciprocatory cutter working in conjunction with said stationary cutter and said rotary cutter, a rotary feeding member coöperating with said rotary cutter for yieldingly engaging a sheet of material with less force than the force with which the sheet is engaged by said reciprocatory cutter, and power transmitting means under the control of the operator for putting said cutters and said feeding member into action, substantially as described.

19. In a machine of the nature described, the combination of a stationary cutter, a rotary cutter, a reciprocatory cutter working in conjunction with said stationary cutter and said rotary cutter, a rotary feeding member coöperating with said rotary cutter for yieldingly engaging a sheet of material with less force than the force with which the sheet is engaged by said reciprocatory cutter, power transmitting means for driving said cutters and said feeding member, and a lever for putting said power transmitting means into action and at the same time moving said rotary feeding member toward said rotary cutter, substantially as described.

20. In a machine of the nature described, the combination of a rotary cutter, a feed member working in conjunction with said rotary cutter for feeding, and a reciprocatory cutter working in conjunction with said rotary cutter for cutting, substantially as described.

21. In a machine of the nature described, the combination of a rotary cutter, a rotary feed member working in conjunction with said rotary cutter for feeding, and a reciprocatory cutter working in conjunction with said rotary cutter for cutting, substantially as described.

22. In a machine of the nature described, the combination of a cutter, a driven feed roller working in conjunction with said rotary cutter for feeding, and a reciprocatory cutter working in conjunction with said rotary cutter for cutting, substantially as described.

23. In a machine of the nature described, the combination of two rotary cutters, a feed member working in conjunction with one of said rotary cutters for feeding, and a reciprocatory cutter working in conjunction with said rotary cutter for cutting, substantially as described.

24. In a machine of the nature described, the combination of two rotary cutters, a driven feed roller working in conjunction with one of said rotary cutters for feeding, and a reciprocatory cutter working in conjunction with said rotary cutter for cutting, substantially as described.

25. In a machine of the nature described, the combination of two driven rotary cutters, a feed roller working in conjunction with one of said rotary cutters for feeding, and a reciprocatory cutter working in conjunction with said rotary cutters for cutting, substantially as described.

In testimony whereof I have signed my name, in presence of two witnesses, this 22nd day of October, in the year one thousand nine hundred and twelve.

CHARLES B. GRAY.

Witnesses:
ROY A. JOHNSTON,
CYRUS KEHR.